Figure 1:
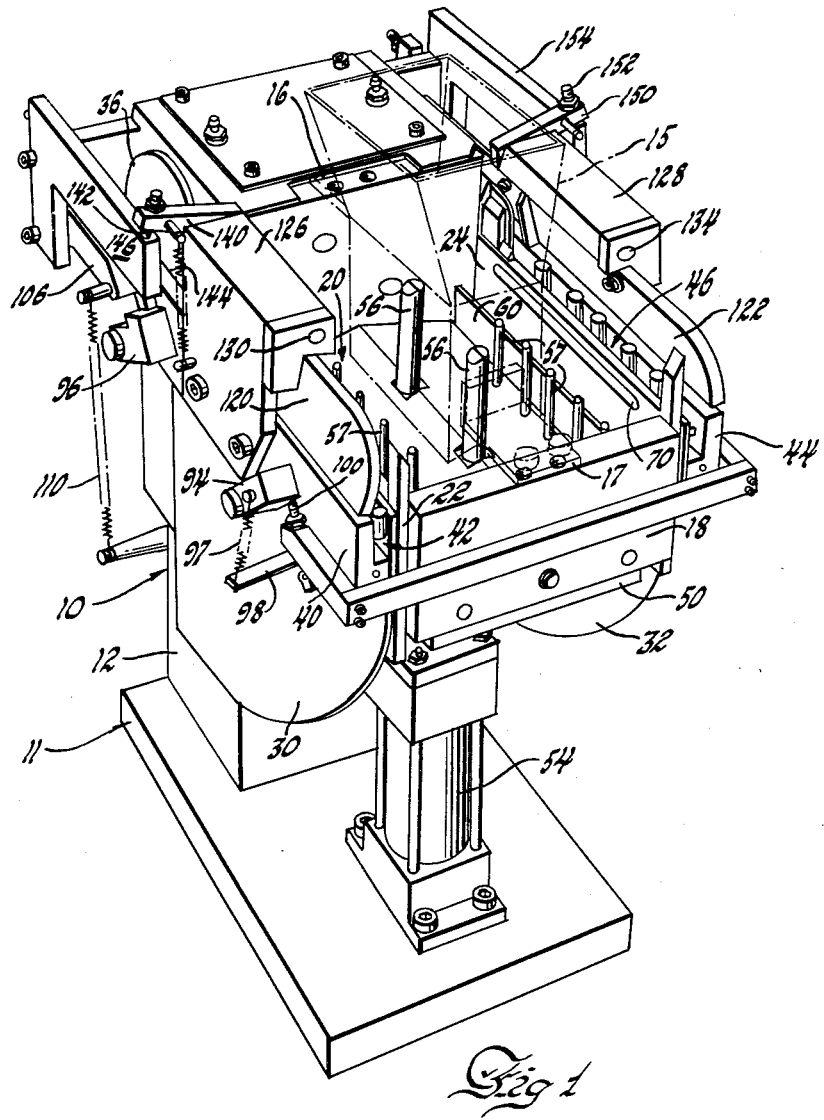

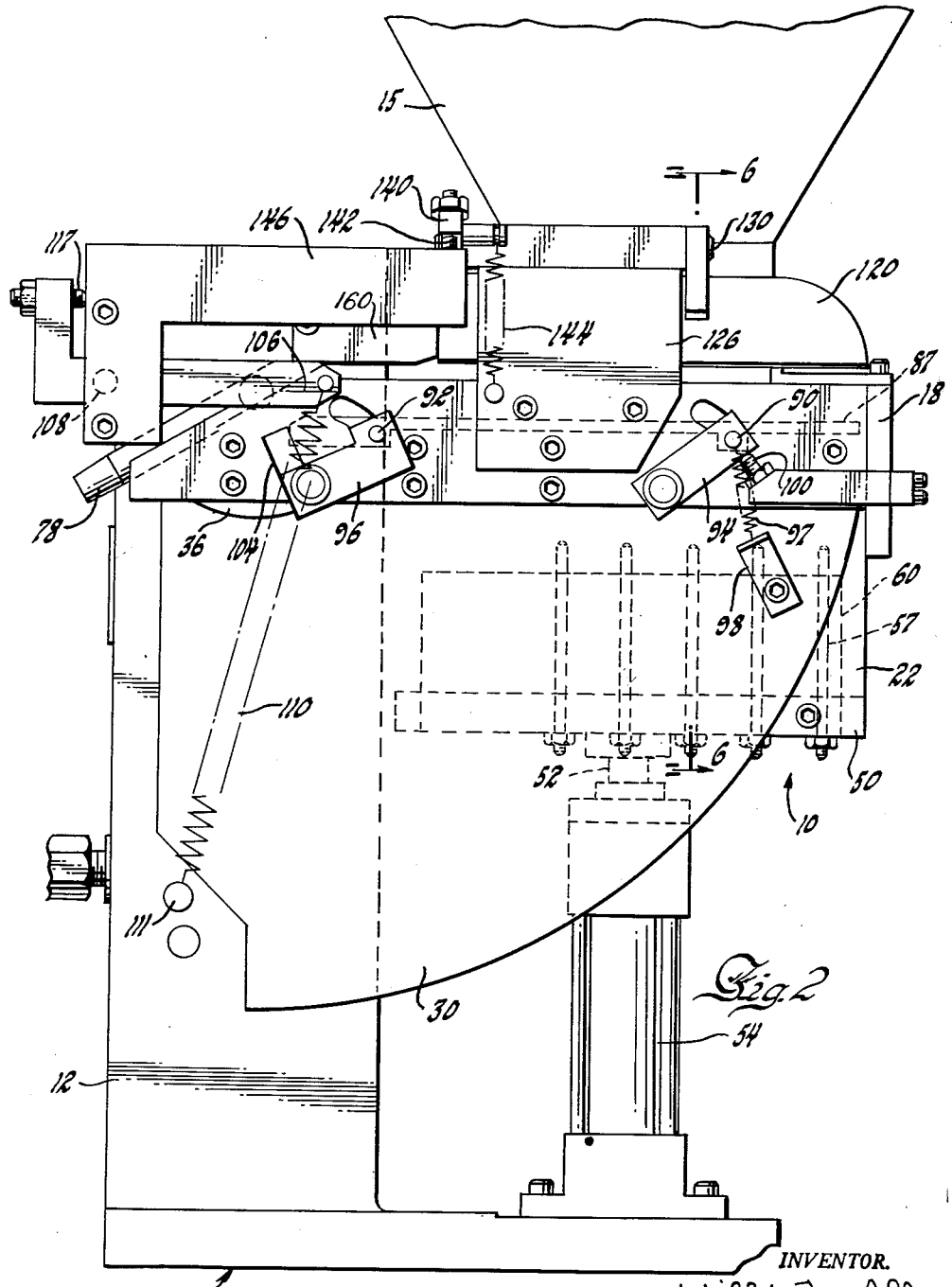

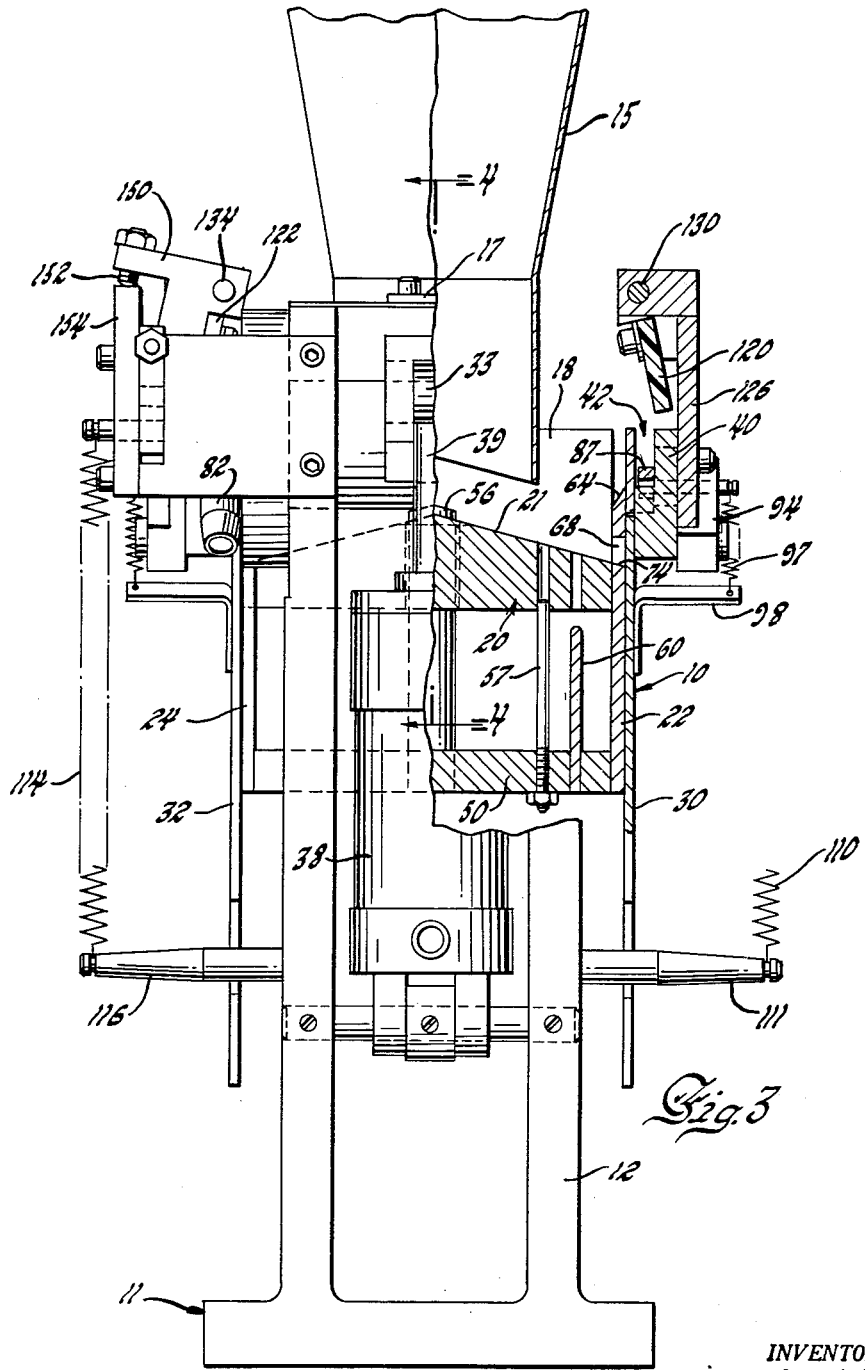

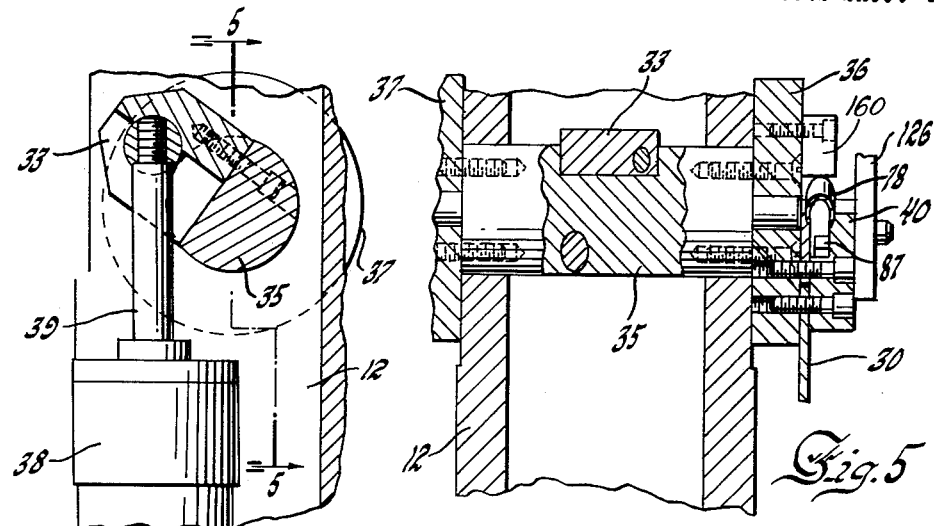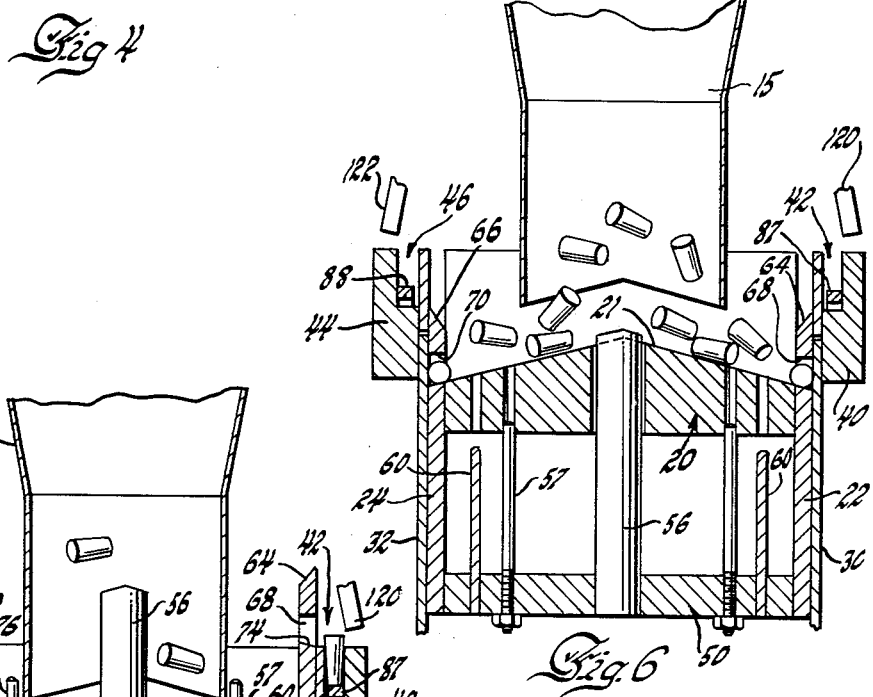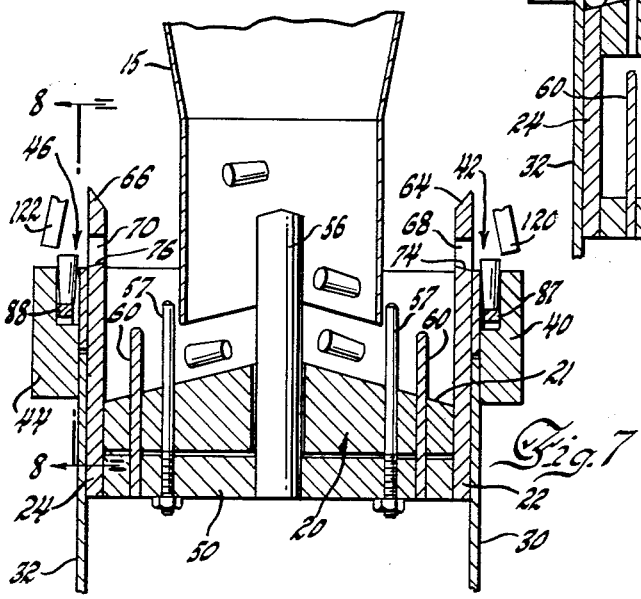

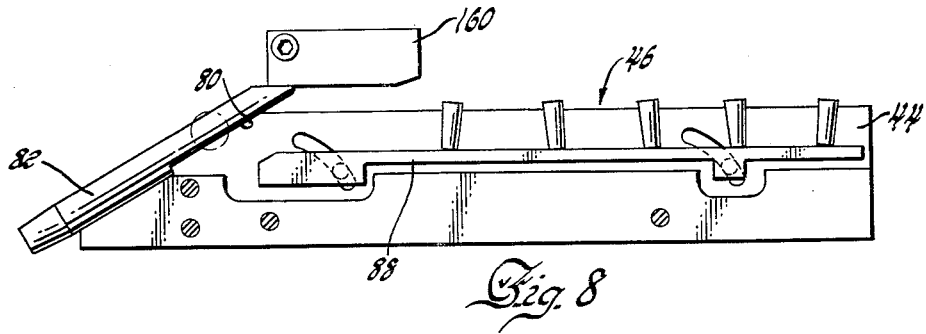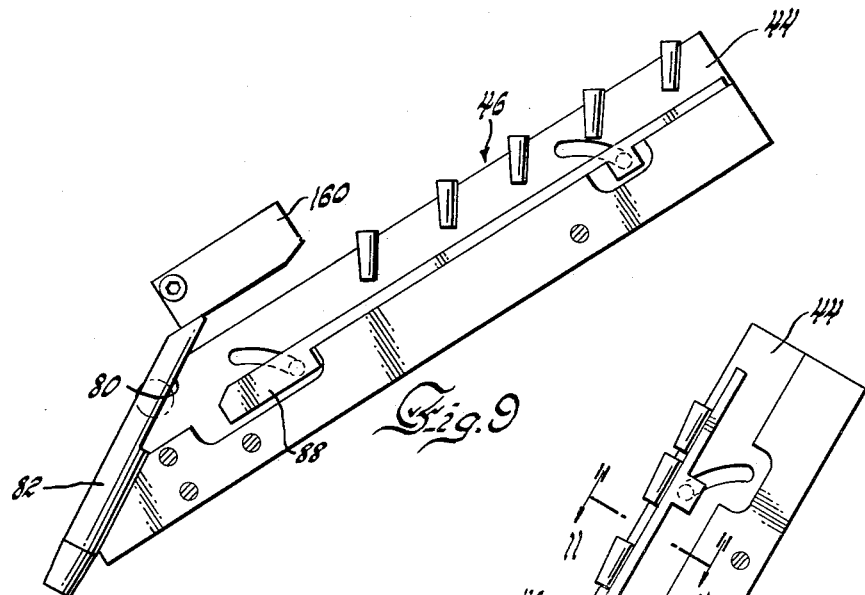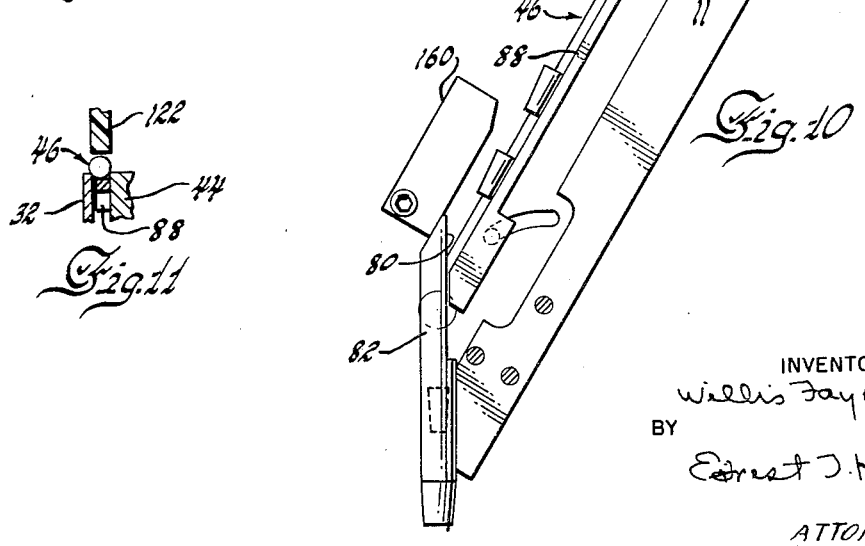

United States Patent Office 2,987,220
Patented June 6, 1961

2,987,220
PARTS HANDLING APPARATUS
Willis Fay Aller, Dayton, Ohio, assignor to The Sheffield Corporation, Dayton, Ohio, a corporation of Delaware
Filed Sept. 26, 1957, Ser. No. 686,451
7 Claims. (Cl. 221—156)

This invention relates to a feeding method and apparatus and more particularly to a method and an improved feeding apparatus for orienting and feeding tapered bearing rollers and the like.

It is an object of this invention to provide an improved orienting and feeding apparatus having features of simplicity in construction and reliability in operation for high production orienting and feeding of parts such as tapered bearing rollers in assembly, inspection and other operations.

It is a further object to provide an advantageous method and apparatus for simply and rapidly orienting and feeding bearing rollers and the like wherein the rollers are first disposed in substantially parallel relationship with their ends similarly oriented and then are rocked in the same direction to substantial axial alignment for endwise feeding in similar orientation.

It is a further object to provide such an apparatus wherein rollers received in random relationship are supported between spaced parallel members forming a channel carrying the rollers in substantially parallel hanging relationship by engagement with their larger ends, the channel being carried for swinging movement to simultaneously rock the rollers in the same direction into substantial alignment for endwise feeding movement from the supporting channel in similarly oriented relationship.

Other objects and advantages of the invention will be apparent from the accompanying description, the appended claims and the accompanying drawings, in which:

FIGURE 1 is a perspective view of an exemplary orienting and feeding apparatus for carrying out the present method and embodying the present invention, FIGURE 2 is a side view in elevation of the apparatus of FIGURE 1, FIGURE 3 is a front view in elevation of the apparatus shown partially broken away to vertical section, FIGURE 4 is a fragmentary section view taken on line 4—4 of FIGURE 3, FIGURE 5 is a fragmentary section taken on line 5—5 of FIGURE 4, FIGURES 6 and 7 are vertical sections through a portion of the apparatus showing it in two different positions in a cycle, and taken generally on line 6—6 of FIGURE 2, FIGURES 8 to 10 illustrate three different positions and orientations of rollers in a sequential orienting and feeding operation, taken on line 8—8 of FIGURE 7, and FIGURE 11 is a fragmentary section on line 11—11 of FIGURE 10 showing the retaining chute maintaining the rollers in endwise alignment.

In a great number of automatic assembly and inspection devices parts to be processed are supplied in random orientation and it is necessary that they be properly oriented and arranged for feeding into the apparatus. This is especially important where parts of difficult configuration and high speed operations are involved. The present invention provides an orienting and feeding apparatus and method which has particular advantages in orienting and feeding tapered bearing rollers in an assembly operation or the like.

In the illustrated exemplary apparatus tapered rollers are first placed in a common plane in substantially parallel relationship with their larger ends similarly disposed and then are simultaneously rocked in the same direction into endwise axial alignment with their larger ends similarly oriented. The rollers are initially in random assortment in a hopper arrangement and are fed from the hopper to a position between parallel substantially horizontal channels which have a width to grip only the larger roller ends and dispose them with their axes in similar parallel relationship by hanging. The channels are then rocked upward and the rollers automatically swing from their parallel relationship into substantial alignment.

Referring more particularly to the drawings, FIGURE 1 illustrates in perspective an orienting and feeding apparatus 10 for taper bearing rollers, including a base 11 with a vertical pedestal 12 extending upward therefrom. A hopper 15 for receiving rollers is connected by bracket 16 to pedestal 12 and by bracket 17 to a forward plate 18 also fixedly supported by the pedestal.

Hopper 15 empties over a floor plate 20 having a V-shaped upper surface 21 inclined outward beyond each side of the hopper exit. Floor plate 20 cooperates with forward plate 18, one wall of pedestal 12 and loading plates 22 and 24 to retain the rollers in random orientation. Hopper side plates 30 and 32 are spaced outwardly of loading plates 22 and 24 and extend thereabove to further retain the rollers.

At its upper end pedestal 12 rotatably supports a pin 35 carrying supporting plates 36 and 37. Side plates 30 and 32 are connected to these supporting plates as indicated in FIGURE 5 for plate 30. Pin 35 is connected through arm 33 with a rod 39 extending from air cylinder 38 housed within pedestal 12. Side plates 30 and 32 are thus supported for up and down swinging or pivoting about the axis of pin 35.

As seen particularly in FIGURES 3, 6 and 7, a supporting bar 40 is fixed to and extends parallel to the upper edge of side plate 30. A channel 42 is thus formed which has a width sufficient to admit the smaller end of bearing rollers but narrow enough to grip the upper end thereof and support the rollers with their axes substantially parallel by hanging. Similarly, a supporting bar 44 is fixed along the upper edge of side plate 32 to form a channel 46 at the other side of the outlet of hopper 15.

Loading structure is provided for loading or feeding rollers from the outlet of hopper 15 into channels 42 and 46 as a first stage in the orienting and feeding operation. A base plate 50, connected to and supported by a connecting rod 52 (FIGURE 2), is vertically moved by air cylinder 54 to perform this loading operation. Base plate 50 mounts agitator bars 56, rods 57 and plates 60 reciprocable within conforming openings in floor plate 20. Loading plates 22 and 24 carried at the outer edges of base plate 50 have inwardly inclined upper ends as indicated at 64 and 66 respectively and also have longitudinal loading slots 68 and 70 adjacent their upper ends.

The agitating and loading structure including base plate 50 is in its lower or retracted position in FIGURES 2, 3 and 6. As seen in FIGURE 6 rollers leaving the lower end of hopper 15 move down the inclined surfaces of floor plate 20 and to each side into the extended slots 68 and 70 adjacent the upper ends of loading plates 22 and 24. When air cylinder 54 is actuated to move base plate 50 upward agitator bars 56, rods 57 and side plates 60 move upward into the mass of rollers retained in the hopper and its associated structure. Simultaneously, those rollers within slots 68 and 70 in substantial axial alignment but with their ends in random orientation, are carried up above the upper edges of side plates 30 and 32. This axial relation determines the relative spacing between the rollers in the next phase of the operation.

The lower edges of slots 68 and 70 are inclined outwardly as indicated at 74 and 76 (see FIGURE 7). Thus, as seen in FIGURE 7, rollers fed upward by plates 22 and 24 roll outward into channels 42 and 46. Due to the particular width of these channels the upper ends of the rollers are retained while the lower ends pivot downwardly to a position such as illustrated in FIGURES 7 and 8. The rollers are then situated in the respective channels in a common plane and in substantially parallel relationship with their larger ends upward. This is the initial stage in the orienting and feeding process.

Air cylinder 38 of FIGURES 3 and 4 is then energized to swing side plates 30 and 32 and the structure which they support upward to incline or tilt channels 42 and 46 downwardly toward pedestal 12. FIGURES 8 to 10, taken generally on line 8—8 of FIGURE 7, and showing the interior of channel 46 with side plate 32 removed, illustrate the progressive steps during this swinging movement in which the rollers are first placed in substantially parallel relationship and are then rocked in the same direction about their upper ends into substantial alignment.

A receiving tube indicated at 82 for channel 46 has an opening at one side thereof indicated at 80 in line with the channel and into which the rollers move endwise at the extreme upper rocked position. Similarly, a receiving tube 78 is fixed at the downward end of channel 42.

An actuating and retaining bar 88 supported within channel 46 provides the base or floor thereof. Similarly, an actuating and retaining bar 87 is provided for channel 42. Referring particularly to FIGURE 2 bar 87 is connected at points 90 and 92 to levers 94 and 96 respectively. Spring 97 connected between bracket 98 on side plate 30 and lever 94 tends to rock both levers 94 and 96 clockwise as seen in that figure and urge lever 94 downward relative to plate 30. In the illustrated position lever 94 engages fixed stop 100 carried from plate 18 which is in turn fixedly supported on pedestal 12.

Stop 100 tends to maintain actuating bar 87 rocked slightly upward when the assembly is fully lowered. The corresponding position for bar 88 of channel 46 is seen in FIGURE 8 and it will be seen that bar 88 is slightly above the depth which would allow free swinging of the rollers. In this position of bar 88 the rollers are maintained slightly cocked and prevented from free swinging. Bars 87 and 88 at opposite sides of the apparatus are actuated simultaneously and similarly.

Referring again to FIGURE 2, lever 96 has an actuating arm 104 situated to engage the outer end of stop 106 which is substantially L-shaped and pivoted at 108. Spring 110 connected to pin 111 on pedestal 12 extends to the outer end of stop 106 to rock it downwardly and maintain screw 117 at its rear end in engagement with a stop plate fixed to pedestal 12.

When cylinder 38 is energized and side plates 30 and 32 move upwardly actuating bars 87 and 88 initially rock downwardly within their channels to free the rollers for rocking about their upper ends. The rollers then assume the position as seen in FIGURE 9 for channel 46. As the movement continues arm 104 engages stop 106 and actuating bar 87 (bar 88 is simultaneously actuated) is moved upward within channel 42. At the extreme upward position arm 104 carries the outer end of stop 106 up with it against the resilience of spring 110. Actuating bar 88 for channel 46 is similarly actuated to a position as seen in FIGURE 10. Thus bars 87 and 88 move up to form the lower surface of chutes or channels retaining the rollers and leading to tubes 78 and 82 for the aligned rollers. Spring 114 and pin 116 seen in FIGURE 3 perform functions similarly to those of spring 110 and pin 111 at the opposite side of the apparatus.

Wiper and retainer blades 120 and 122 are carried by side plates 30 and 32 for association with channels 42 and 46 respectively. Supports 126 and 128 fixed to the respective side plates carry the respective wiper blades 120 and 122 for pivoting about the axes of pins 130 and 134 parallel to the respective channels. Pin 130 for blade 120 has an arm 140 extending outwardly therefrom. Stop screw 142 at the outer end of arm 140 is drawn downward by spring 144 against the surface of a stop blade 146 when the assembly is in a lowered position. This results in blade 120 being rocked outward to a position seen in FIGURES 1 and 3 when side plates 30 and 32 are in their lower receiving position.

Similarly, an arm 150 for pin 134 of blade 122 has a stop 152 maintained against a stop plate 154 when the assembly is lowered to maintain blade 122 outward.

When cylinder 38 is energized and side plates 30 and 32 move upward from their receiving to unloading positions, blades 120 and 122 are carried therewith as pivot pins 130 and 134 of these plates move upward. Arms 140 and 150 rock downward as stops 142 and 152 are released and blades 120 and 122 move inward to wipe excess or improperly located rolls back into the retaining structure and clear of supporting channels 42 and 46. During further upward movement these blades perform a retaining function in cooperation with actuating bars 87, 88. For example, as seen in FIGURE 11, blade 122 cooperates with the sides of channel 46 and actuating bar 88 to retain the rolls in endwise alignment by providing a tube-like chute leading to unloading tube 82. Member 120 of the right hand channel aids in guiding the rolls into tube 78. Plates 160 fixed at each side of the rocking assembly form continuations of blades 120 and 122 along the channels.

In operation cylinder 54 is energized to raise base plate 50 upward. Agitating bars 56, rods 57 and plates 60 are carried upward through floor plate 20 to agitate and separate the rollers from hopper 15 and insure that the slots 68 and 70 of the loading plates are filled. During continued upward movement of base plate 50 rollers within slots 68 and 70 are carried upward above hopper side plates 30 and 32 and roll into channels 42 and 46 where they are initially oriented in substantially parallel relationship while maintained slightly cocked by respective bars 87 and 88 (see FIGURE 8). Plates 60 aid in retaining excess rollers in the hopper.

As base plate 50 is retracted, cylinder 38 in pedestal 12 is energized to rock side plates 30 and 32 and associated structure upward. During the first portion of this movement actuating bars 87 and 88 drop downward within their respective channels to allow the rollers to swing simultaneously in the same direction about their larger upper ends. This phase of the operation is illustrated for channel 46 in FIGURE 9.

Wiper blades 120 and 122 are almost immediately spring-urged toward one another and into association with respective channels 42 and 46 to clear the channels of excess or improperly oriented rollers and retain the upper roller ends.

As side plates 30 and 32 rise still further, respective actuating bars 87 and 88 move to their extreme upward positions to place the rollers in substantial alignment and retain them for movement from the apparatus through unloading tubes 78 and 82. The cycle is repeated so long as oriented rollers are required.

The method of this invention could be performed manually rather than automatically as with the illustrated apparatus by placing rollers in parallel relation and then manually rocking them in one direction into axial alignment.

Thus, it is seen that a method and apparatus have been provided for orienting and feeding difficult parts in an extremely simple manner. Parts such as bearing rollers are initially located in substantially parallel relationship with their larger ends similarly oriented. The parts are then simultaneously rocked in the same direction into alignment and fed from the apparatus. Through this simple approach a basically simple and reliable operation and structure is achieved for high speed operations.

While the method and form of apparatus herein described constitutes a preferred embodiment and application of the invention, it is to be understood that the invention is not precisely limited thereto and that changes may

What is claimed is:

1. Apparatus for orienting and feeding tapered rollers of roller bearings and the like comprising a base, a receiving hopper on said base for containing a quantity of rollers in random orientation, receiving means pivotally mounted on said base including parallel support means providing a channel having a width to engage only the larger ends of rollers fed thereinto, said channel having a receiving position substantially horizontal, means for feeding rollers from said hopper to said channel including means for first placing said rollers in axial alignment with random endwise orientation to establish a basic relative spacing and then feeding said rollers transverse the line of axial alignment into said channel whereby the rollers are automatically located with their axes in substantially parallel relationship in said channel with their larger ends upward by hanging while maintaining the same basic relative spacing, actuating means operatively connected to said receiving means for swinging said channel to an inclined position whereby said rollers are automatically rocked simultaneously in the same direction about their larger ends, and retaining means forming the floor of said channel movable upward to engage the lower roller ends and then carry the rollers into substantial axial alignment and similar orientation by rocking about their larger ends for endwise feeding movement along said channel and from the apparatus.

2. An apparatus as set forth in claim 1 further comprising a wiping and retaining plate, means in said receiving means carrying said plate for pivoting movement about an axis parallel to said channel from a position displaced therefrom to a position adjacent thereto whereby improperly oriented rollers are moved from association with the channel and rollers therein are retained during swinging movement of said receiving means.

3. An apparatus as set forth in claim 1 wherein said retaining means includes an elongated bar forming the floor of said channel, said bar being disposed with the channel in a substantially horizontal position to engage rollers fed thereinto and maintain them in a semi-cocked position, said actuating means including means operative during swinging movement of said channel to relatively lower said bar in the channel to release said rollers and then move said bar upward to engage and retain the rollers in substantial alignment.

4. Apparatus for orienting and feeding tapered rollers of roller bearings and the like comprising a base, receiving means on said base including parallel receiving members providing a channel having a width to engage only the larger ends of bearing rollers fed thereinto, means on said base mounting said channel for swinging movement about a pivot axis from a substantially horizontal receiving position, feed means on said base for feeding rollers into said channel whereby the rollers are automatically placed in first positions with their axes in substantially parallel relationship by hanging at their larger ends, clearing and retaining means mounted for bodily swinging movement with said channel and carried for pivoting about an axis parallel thereto from a position clear of said channel to a retaining position adjacent thereto whereby improperly oriented rollers are removed from the channel, an elongated actuating bar in said receiving means forming the floor of said channel, said bar having an initial position with the channel substantially horizontally disposed to engage and maintain said rollers in semi-cocked positions, actuating means operatively connected to said receiving means to swing said channel, whereby said rollers are rocked from their substantially parallel positions into axial alignment with their larger ends similarly orientated, said bar being operatively associated with said actuating means to first drop away and free said rollers for rocking and then raised to retain said rollers in substantial alignment and form an exit channel therefor in cooperation with said retaining member.

5. An apparatus for orienting and feeding tapered rollers of roller bearings and the like comprising a base, receiving means on said base including a pair of parallel channels having a width to grip bearing rollers fed thereinto only at their larger ends, said channels having substantially horizontal receiving positions whereby rollers fed thereinto are placed in a first relationship with their axes in substantially parallel relationship and with their larger ends upward, hopper means on said base between said channels for containing a quantity of rollers in random disposition, feed means carried on said base in operative association with said hopper and receiving means for feeding rollers from the hopper into the channels, and actuating means operatively connected to said receiving means for swinging movement thereof to simultaneously rock said rollers into substantial axial alignment and feed them endwise from the apparatus.

6. An apparatus as set forth in claim 5 wherein said feed means includes agitator members in association with said hopper and a floor having an upwardly directed V-shaped retaining surface parallel to said channels for diverting rollers from the hopper to each side toward the channels, said feed means including lifting means for engaging and carrying rollers from the extremities of said floor upward for movement into said channels.

7. An apparatus as set forth in claim 5 wherein said receiving means includes retaining means associated with each of said channels, each of said retaining means including parallel elongated members lying along the respective channels and movable toward one another to form, in cooperation with the respective channel, a retaining chute for the aligned rollers.

References Cited in the file of this patent

UNITED STATES PATENTS

| | | |
|---|---|---|
| 676,761 | Morris | June 18, 1901 |
| 691,316 | Johnson | Jan. 14, 1902 |
| 1,609,994 | Ellis | Dec. 7, 1926 |
| 1,647,356 | Hendry | Nov. 1, 1927 |
| 1,760,441 | Risser | May 27, 1930 |
| 2,858,930 | Aidlin | Nov. 4, 1958 |

FOREIGN PATENTS

| | | |
|---|---|---|
| 220,249 | Great Britain | Aug. 14, 1924 |